Aug. 4, 1931. G. F. GALLOWAY 1,817,551
CULTIVATOR
Filed May 28, 1930 2 Sheets-Sheet 1
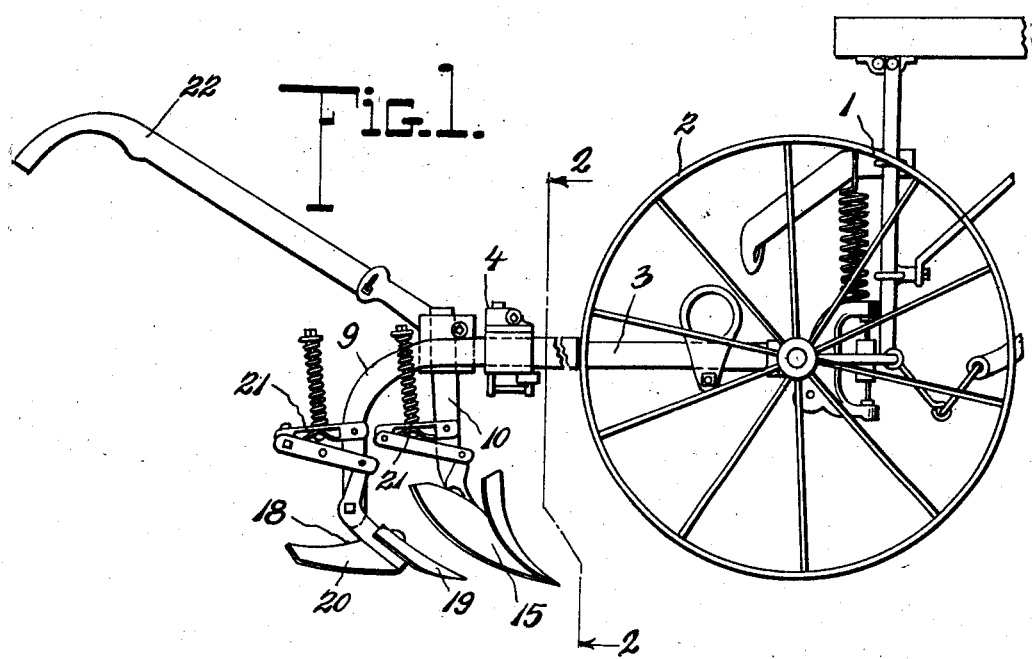
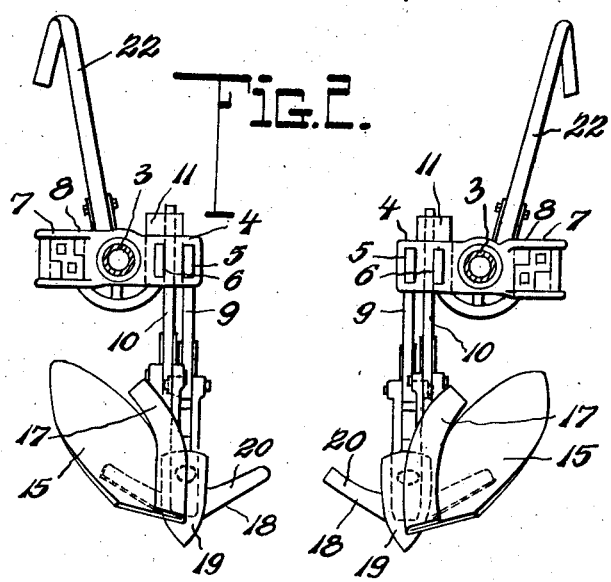
INVENTOR
G. F. Galloway
BY
ATTORNEYS Aug. 4, 1931.     G. F. GALLOWAY     1,817,551
CULTIVATOR
Filed May 28, 1930      2 Sheets-Sheet 2

INVENTOR
G. F. Galloway
BY
ATTORNEYS

Patented Aug. 4, 1931

1,817,551

UNITED STATES PATENT OFFICE

GENERAL FRANKLIN GALLOWAY, OF FAYETTE, ALABAMA

CULTIVATOR

Application filed May 28, 1930. Serial No. 456,487.

This invention relates to cultivators and particularly to those types of cultivators wherein a plurality of cultivating tools or implements is disposed to perform a single operation, namely, a loosening action, on the soil adjacent to rows of plants such as corn, cotton, or the like.

It is customary to use a device of this character to perform the aforesaid loosening action, and then follow this operation as a separate and distinct operation, by running a small plow or other suitable implement along the row, whereby to throw the dirt onto the row, or "dirt" the row as it is sometimes called in farm parlance. It is obvious that cultivation in such separate and distince operations requires a considerable amount of time, and one of the objects of the present invention is to provide a means for producing these results simultaneously by a single cultivator, thereby eliminating the necessity of making two or more trips to each row, as has been commonly required heretofore.

A further object of the invention is to provide an attachment for certain well known makes of cultivators, having the usual wheeled frame carrying cultivating instrumentalities disposed in staggered relation and adapted to operate on opposite sides of a row, said attachment affording a means for properly associating certain of said instrumentalities to perform the usual double operation, as hereinbefore mentioned, as a single operation.

A still further object of the invention is to provide certain novel implements capable of being readily and quickly attached to the usual implement shanks, whereby certain of the implements will produce a breaking up of a relatively thin layer of top soil and turn the same away from the row, thereby removing the trash, clogs, weeds, etc., and certain others of the said implements throw up or pull onto the row the exposed rich, mellow soil.

Other and further objects and advantages of the invention will be hereinafter set forth and the novel features thereof defined by the appended claims.

In the drawings:

Fig. 1 is a fragmentary side elevation of a well known make of cultivator showing the invention applied thereto, certain of the usual parts of the cultivator frame being omitted for the sake of clearness;

Fig. 2 is a sectional view taken on the line 2—2 of Fig. 1;

Figure 3:
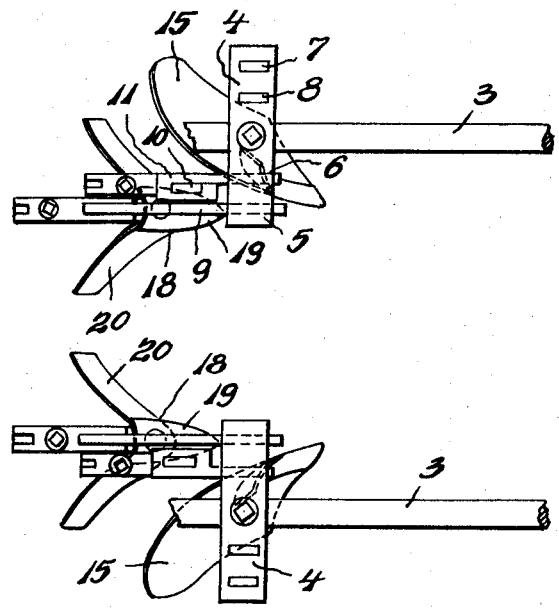
Fig. 3 is a top plan view, certain of the parts being broken away.
Figures 4, 5:
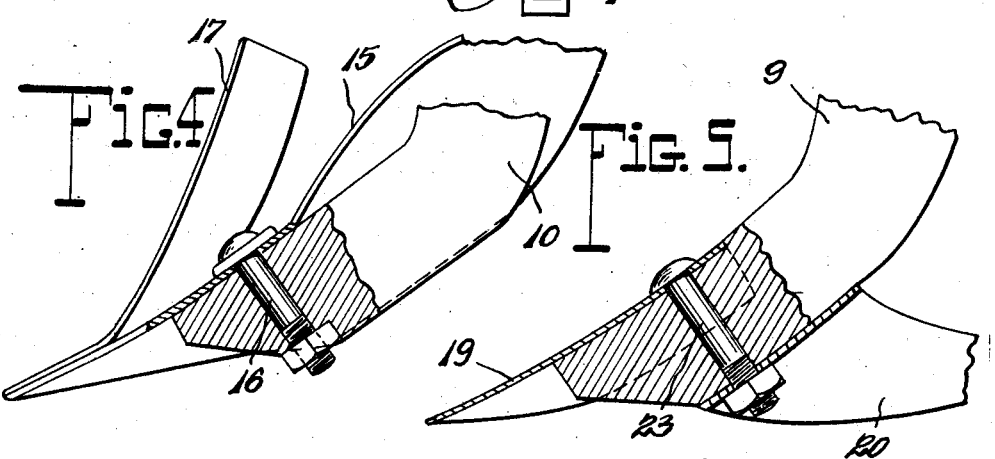
Fig. 4 is an enlarged detail side elevation of one of the cultivating implements, certain portions thereof being broken away and shown in section.
Fig. 5 is an enlarged detail side elevation of another cultivating implement, certain portions being broken away and shown in section.
Figure 6:
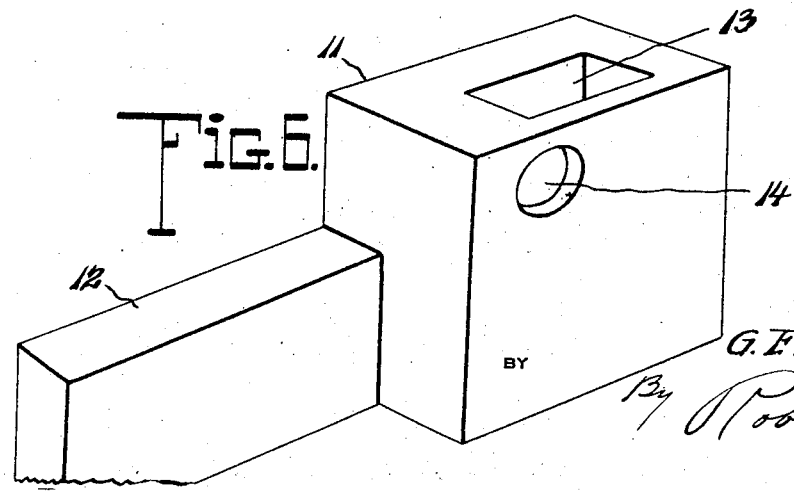
Fig. 6 is an enlarged detail perspective view of the socket attachment.

Like reference characters designate corresponding parts in the several figures of the drawings, wherein 1 denotes generally a cultivator frame of a well-known make, having the usual wheels 2 and longitudinal beams 3. The beams 3 are interchangeable and carry the usual clamping members 4 at their rearward ends, each of said clamping members including a transverse support having spaced horizontal implement shank receiving openings 5 and 6 adjacent to one end thereof and spaced vertical shank receiving openings 7 and 8 adjacent to the opposite end.

The horizontal openings 5 and 6 adjustably receive the usual curved feet or shanks 9 extending rearwardly to dispose cultivating tools or implements at the rear of the cultivator, whereas the vertical openings 7 and 8 are for the purpose of customarily receiving the usual straight shank 10 of the forward cultivating implements to produce a normally staggered relation. The clamping members 4 are provided with the usual means for securing the shanks in the openings.

By providing two horizontal openings 5 and 6 and two vertical openings 7 and 8 for each of the clamping members 4, a transverse adjustment of the cultivating implements is permitted whereby the distance between the said implements or between the implements and the row to be cultivated may be varied.

In carrying out the objects of the present invention, the beams 3 are preferably interchanged from their normal positions for the purpose of positioning the horizontal openings 5 and 6 towards the center of the cultivator to dispose the cultivating implements relatively close to the opposite sides of the row adapted to be straddled by the cultivator. The curved feet or shanks 9 are preferably placed in the openings 5 at the extreme inner ends of the clamping members 4, and socket attachments 11 having shanks 12 and implement shank receiving openings 13 are provided for the purpose of positioning certain of the cultivator implements in substantial alignment with the implements carried by the curved feet 9. 14 denotes an aperture extending through the socket for the purpose of receiving a pin or wedge to secure the implement shank in the opening 13. Obviously, any other suitable means for securing the shanks therein may be employed. The shanks 12 of the socket attachments are preferably inserted in the openings 6 of the clamping members and the vertical feet or shanks 10 positioned in the openings 13.

Referring to the novel cultivating instrumentalities or implements, the straight shanks 10 carried by the socket attachments are preferably provided with small plow blades or moldboard shovels 15 secured thereto in the usual manner by means of the bolts 16, these plow blades being substituted for the usual tools or shovels. Formed on said blades are wing members 17 extending from the point of the blade upwardly and rearwardly of the same, the said wing members being curved or bent over in such a manner as to dispose the rear portions of the said members in a substantially edgewise or perpendicular position with respect to the blade over the approximate center thereof. Obviously, the wing members may be attached to the blades in any suitable manner, but for the purpose of illustration, they have been shown formed integrally therewith and rebent on the same. Such constructions provide points for the blades of double thickness which is very desirable since the said points are subject to more or less wear. By virtue of this particular construction, the blades are adapted to break up a relatively thin layer of top soil and turn the same away from the row to expose the rich, mellow soil therebeneath.

Associated with the aforementioned plow blades or turning elements are sweeps 18 which are adapted to pull the exposed soil onto the row. The sweeps are preferably carried by the curved feet 9 in substantial alignment with the plow blades 15 and are formed with a removable point or tooth 19 and a winged heel or scraper 20 suitably secured to the feet as by bolts 23.

21 designates generally the usual spring trip construction for the cultivating implements. Handles 22 are also shown for use as a walking cultivator. Obviously, the cultivator may be of the walking, riding, or combined walking and riding type.

The operation of the cultivator should be obvious from the foregoing, and while the specific details of construction have been herein shown and described, the invention is not confined thereto as changes and alterations may be made without departing from the spirit thereof as defined by the appended claims.

Having thus described my invention, what I claim as new and desire to secure by Letters Patent is:

1. In a cultivator of the class described including a wheeled frame, spaced longitudinal and interchangeable beam members carried thereby, said beam members having a plurality of implement shank clamping members arranged transversely thereof, said clamping members being provided with spaced openings, socket attachments for said clamping members having shanks disposed in certain of said openings, said socket attachments having implement shank receiving openings, soil turning implements having shanks disposed in said last mentioned openings, said soil turning implements including a curved blade and a curved wing extending rearwardly and upwardly in spaced relation thereto from the point thereof whereby to turn a relatively thin layer of top soil away from a row, and a plurality of sweeps having shanks disposed in certain others of said openings in substantial alignment in rear of said turning implements whereby to pull the exposed soil onto the row.

2. In a cultivator, the combination of a plow blade for turning a relatively thin layer of top soil away from a row, said blade having a rebent wing member forming a point on said blade of double thickness, and a sweep positioned in substantial alignment in rear of said plow blade to pull the exposed soil onto the row, said sweep comprising a tooth and a winged heel scraper associated therewith.

3. In a cultivator, the combination of a plow blade having an upstanding curved wing member attached thereto in superposed relation for deflecting a relatively thin layer of top soil to one side of a row, and a sweep located in the rear of said plow blade for pulling the exposed soil onto the row, said sweep including a winged heel scraper and a detachable point therefor.

4. A cultivator tool comprising a curved plow blade and a curved wing member connected to the forward portion thereof and extending substantially parallel with the edge of said plow blade, the curvature of said wing member being substantially the same as the curvature of the plow blade at the connection therewith and increasing in a longitudinal direction towards the center of said wing member so as to dispose the rear portion of said wing member towards the center of and substantially at right angles to said blade.

5. A cultivator tool comprising a curved plow blade and a wing member of uniform width connected thereto at the forward portion thereof, said wing member extending longitudinally of said blade adjacent to one edge thereof and being curved upwardly and having a permanent twist imparted to the same whereby to dispose the rear portion of said wing member substantially edgewise to said blade.

In testimony whereof I affix my signature.

GENERAL FRANKLIN GALLOWAY.